(12) United States Patent
Tamaki (10) Patent No.: US 8,077,488 B2
(45) Date of Patent: Dec. 13, 2011

(54) SWITCHING-TYPE POWER-SUPPLY UNIT AND A METHOD OF SWITCHING IN POWER-SUPPLY UNIT

(75) Inventor: Ichiro Tamaki, Mihama-ku (JP)

(73) Assignee: Kawasaki Microelectronics, Inc., Chiba (JP)

( * ) Notice: Subject to any disclaimer, the term of this patent is extended or adjusted under 35 U.S.C. 154(b) by 662 days.

(21) Appl. No.: 12/285,826

(22) Filed: Oct. 15, 2008

(65) Prior Publication Data
US 2009/0103334 A1 Apr. 23, 2009

(30) Foreign Application Priority Data
Oct. 17, 2007 (JP) .................................. 2007-269901

(51) Int. Cl.
*H02M 3/335* (2006.01)
(52) U.S. Cl. .................................... 363/21.16; 323/235
(58) Field of Classification Search .................. 323/319, 323/235; 363/21.01, 21.03, 21.12–21.18
See application file for complete search history.

(56) References Cited

U.S. PATENT DOCUMENTS

| | | | |
|---|---|---|---|
| 5,720,607 A * | 2/1998 | Morio et al. ..................... | 431/18 |
| 6,229,716 B1 | 5/2001 | Preller | |
| 6,459,594 B1 * | 10/2002 | Tsuji et al. ................. | 363/21.08 |
| 7,245,087 B2 | 7/2007 | Nishikawa et al. | |
| 2002/0089863 A1 * | 7/2002 | Yasumura .................. | 363/21.14 |

FOREIGN PATENT DOCUMENTS

| | | |
|---|---|---|
| JP | A-05-168234 | 7/1993 |
| JP | A-05-344715 | 12/1993 |
| JP | A-06-030558 | 2/1994 |
| JP | A-09-023646 | 1/1997 |
| JP | B2-3097436 | 10/2000 |
| JP | B2-3458369 | 8/2003 |
| JP | A-2004-015901 | 1/2004 |
| JP | B2-3700844 | 7/2005 |
| JP | A-2006-129548 | 5/2006 |

\* cited by examiner

*Primary Examiner* — Harry Behm
*Assistant Examiner* — Matthew Grubb
(74) *Attorney, Agent, or Firm* — Oliff & Berridge, PLC (57) ABSTRACT

A switching-type power-supply which enables the switching with little power loss and a method of switching the switching-type power-supply are provided. The switching-type power-supply unit includes a transformer with primary, secondary, winding and control windings, a switch which switches supply of a primary current from a dotted terminal to a non-dotted terminal through the primary winding, a rectifying diode connected the secondary winding, a monitoring signal generation circuit with a diode and a resistor, the diode between GND and a dotted terminal of the control winding, the resistor between GND and a non-dotted terminal of the control winding, the monitoring signal generation circuit generating a monitoring signal at the dotted terminal of the control winding, and a control unit with a zero-point detector and a controller. The zero-point detector monitoring the monitoring signal and supplying a detection signal to the controller. The controller determining on-timing of the switch based on the detection signal supplied from the zero-point detector.

11 Claims, 6 Drawing Sheets

RELATED ART

FIG.5

RELATED ART

FIG. 6

$$V_{out} = -R \cdot C \cdot dV_{in}/dt$$

SWITCHING-TYPE POWER-SUPPLY UNIT AND A METHOD OF SWITCHING IN POWER-SUPPLY UNIT

CROSS-REFERENCE TO RELATED APPLICATION

Exemplary embodiments of this invention were first described in and claim priority from Japanese Application No. 2007-A-269901, which is incorporated by reference in its entirety.

BACKGROUND

This invention relates to a switching-type power-supply unit that enables the switching with a minimum power loss and a method of switching in the switching-type power-supply unit.

Figure 4:
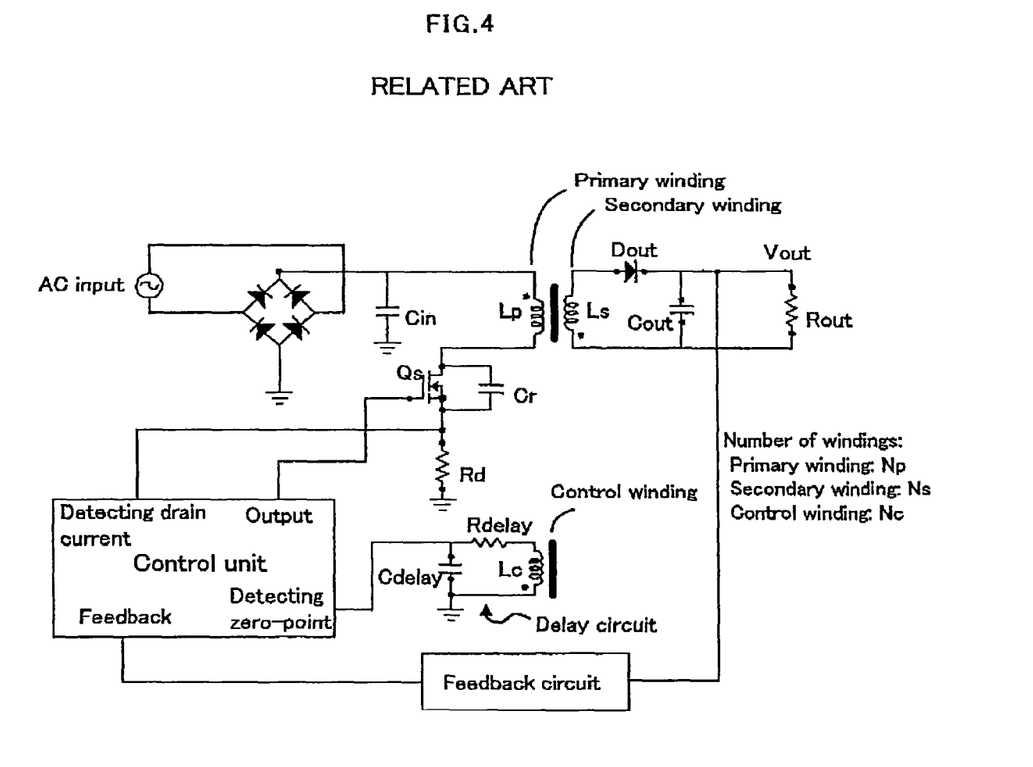
FIG. 4 shows a circuit layout of a power-supply unit of ringing chalk converter type of a related art.

As a conventional switching-type power-supply unit with an output power of about 150 W, a ringing chalk converter, which is a kind of fly-back converter, is often used. An exemplary circuit layout of a ringing chalk converter is shown in FIG. 4. In FIG. 4, the source electric power is supplied to a dotted terminal of the primary winding of the transformer. The other terminal of the primary winding is connected to GND through a switch Qs. By turning on and off the switch Qs at a predetermined timing, electric power is supplied to the secondary winding of the transformer. The output of the secondary winding is rectified and smoothed, and the output voltage of the power-supply unit is generated. A MOSFET is often used as the switch Qs. A capacitor Cr is generally connected in parallel with the MOSFET to construct a "snubber circuit".

In the switching-type power-supply unit shown in FIG. 4, a zero-current detection circuit determines on-timing of the switch Qs. While, an output voltage of the feedback circuit and a voltage indicating the drain current determines off-timing of the switch Qs.

Figure 5:
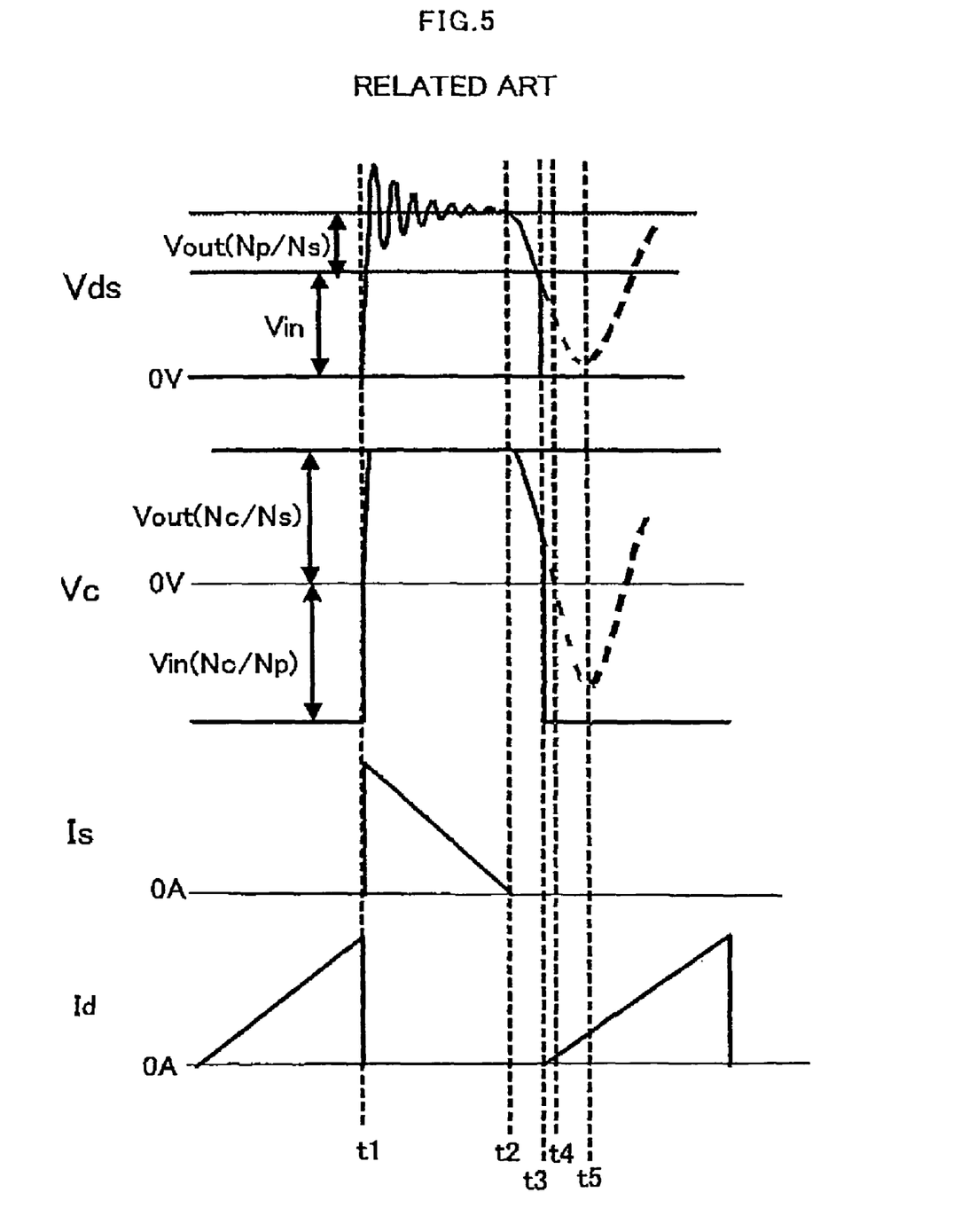
FIG. 5 shows exemplary wave profiles of drain voltage Vds, voltage Vc between both terminals of the control winding 12c, secondary current Is, drain current Id and drive output Dr shown in the circuit layout of FIG. 4.

FIG. 5 shows waveforms of the drain voltage (Vds), the signal output from the control winding to the control unit (Vc), the secondary current (Is) and the drain current (Id).

During the period that the switch is ON, the drain current (Id) is supplied through the inductance Lp of the primary side of the transformer. The drain current (Id) is converted into a voltage by the resistor Rd, and input to the control unit. The control unit compares the voltage with a signal from the feedback circuit connected to the secondary side of the transformer, determines the off timing (t1) of the switch (MOSFET), and turns off the switch. When the switch is turned off, discharge of the energy from the inductance Ls of the secondary side of the transformer starts and a current flows through the diode Dout of the secondary side. The drain voltage (Vds) is kept almost constant during the period from t1 to t2 although it includes some noises as shown in FIG. 5.

When the discharge of the energy from the secondary side of the transformer is completed at t2, the charged electricity in the snubber capacitor Cr starts to discharge. Then, a resonant occurs between Lp and Cr, and the drain voltage (Vds) starts to decrease gradually during the period after t2 as shown in FIG. 5.

The resonant frequency f is determined by Lp and Cr as follows:

$$f = 1/(2\pi * (Lp * Cr)^{1/2})$$

The waveform at the control winding of the transformer is shown Vc in FIG. 5. When Vc becomes nearly zero at around t3, which is the timing when the inductance Ls of the secondary side of the transformer completes the discharge. The control unit may turn on the switch Qs and starts the next switching cycle at t3.

However, it is difficult to sense negative voltage by a control unit that is built to operate with positive voltages. Therefore, the detection of zero-point occurs when the voltage Vc is still above zero.

If the switch Qs turns on at t3, as in FIG. 5, the power loss (switching loss), which is calculated as Id*Vds is large because the drain voltage Vds is still high. The power loss is reduced if the switch Qs turns on at the true zero-crossing of Vc at t4 of FIG. 5 or better still when Vc is at a minimum point t5 of FIG. 5.

In order to solve the above mentioned problem, a delay circuit is provided between the control winding of the transformer and the control unit as shown FIG. 4. The delay circuit delays the output signal (Vc) from the control winding to the control unit. This results in that the switch turns on when the drain voltage (Vds) is low enough.

For example, Japanese patent 3,458,369, which is incorporated by reference in its entirety and hereinafter referred as Reference 1, discloses a switching-type power-supply unit including a delay circuit.

However, in the conventional switching-type power-supply unit including a delay circuit:
1) The added delay circuit requires an additional cost.
2) When the capacitance of the snubber capacitor and/or the inductance Lp of the primary side of the transformer are changed, the delay constant changes. Accordingly, a delay circuit with a fixed delay constant cannot be applied for various applications.

SUMMARY

This invention provides a switching-type power-supply unit which enables the switching with a little power loss and a method of switching the switching-type power-supply unit.

The switching-type power-supply unit is comprised of
a transformer comprising a primary winding, a secondary winding and a control winding;
a switch which switches supply of a primary current from a dotted terminal to a non-dotted terminal through the primary winding;
a rectifying circuit which allows a secondary current to flow from a dotted terminal to a non-dotted terminal of the secondary winding;
a monitoring signal generation circuit comprising a monitoring diode and a resistor, the monitoring diode disposed between GND and a dotted terminal of the control winding, the resistor disposed between GND and a non-dotted terminal of the control winding, the monitoring signal generation circuit generating a monitoring signal at a terminal of the diode connected to the dotted terminal of the control winding; and
a control unit comprising a zero-point detector and a controller, the zero-point detector monitoring the monitoring signal and supplying a detection signal to the controller, the controller determining on-timing of the switch based on the detection signal supplied from the zero-point detector.

According to this invention, a switching-type power-supply unit, which controls the timing of the switching with low cost and keeps versatility, is provided. Also the method of controlling the switching-type power-supply unit is provided.

DETAILED DESCRIPTION OF EMBODIMENTS

Figure 1:
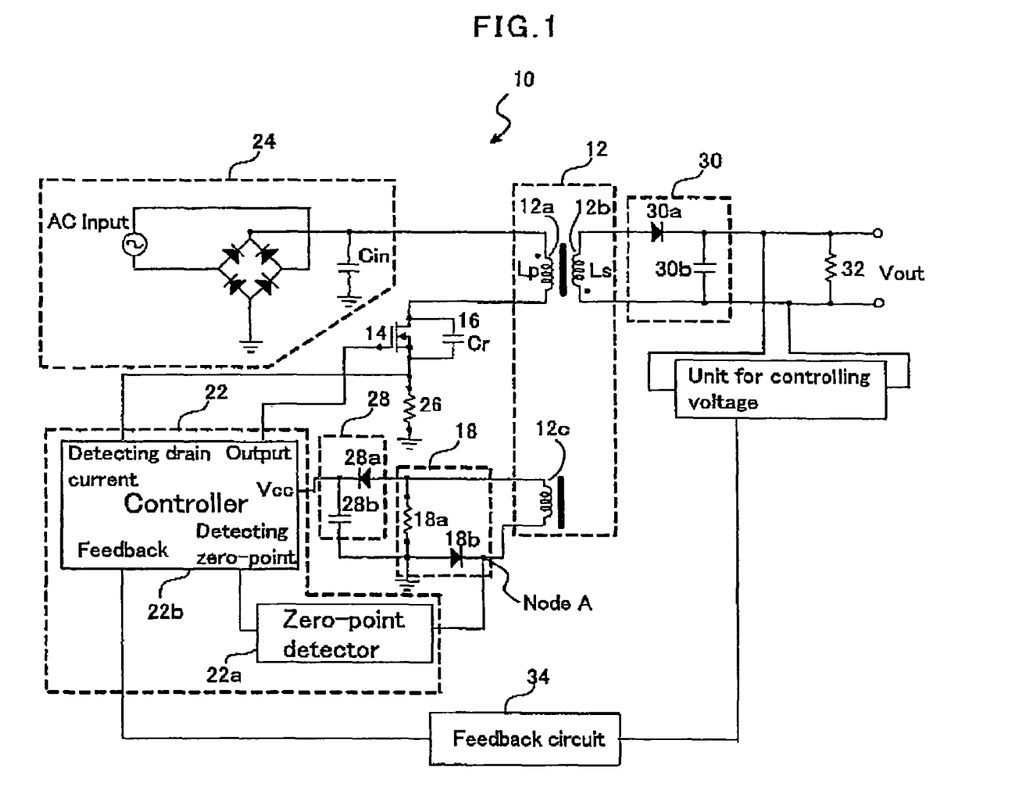
FIG. 1 shows an exemplary circuit layout of a power-supply unit of this invention.
Figure 2:
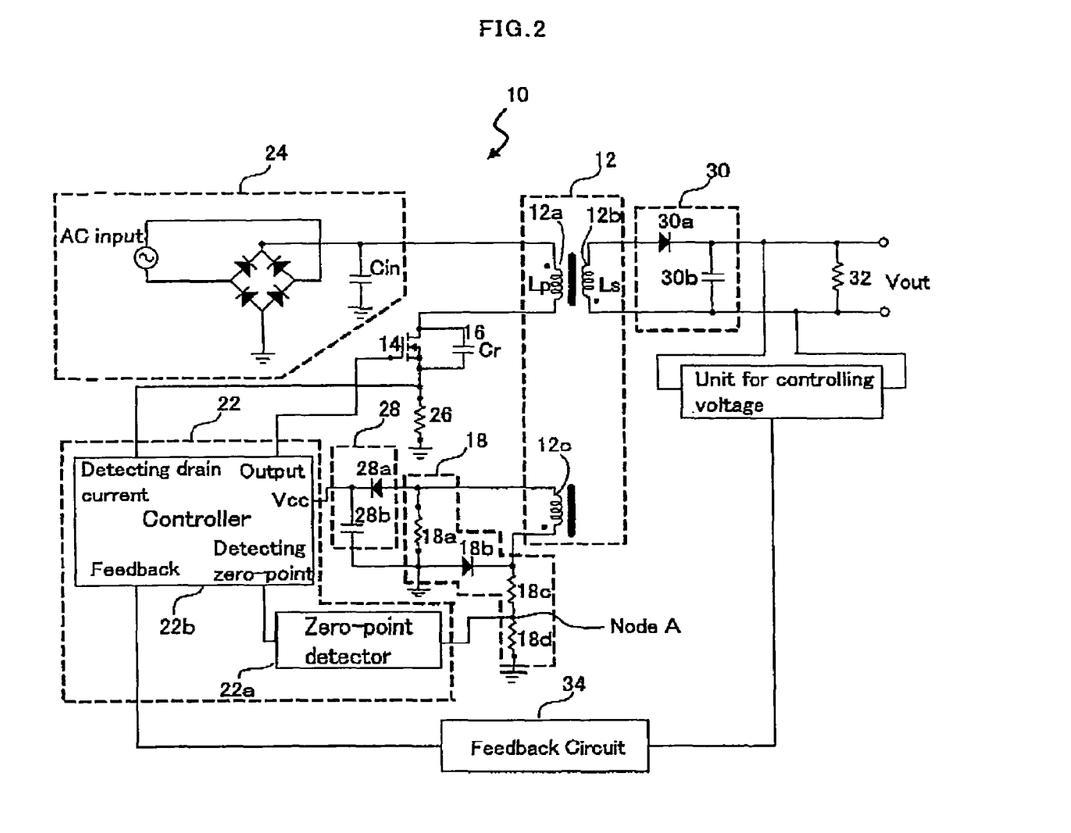
FIG. 2 shows another exemplary circuit layout of a power-supply unit of this invention.

FIG. 1 shows an exemplary circuit layout of a power-supply unit 10 of this invention. FIG. 2 shows another exemplary circuit layout of a power-supply unit 10 of this invention. The same reference numerals are used for the same portions in FIGS. 1 and 2.

As shown in FIG. 1, the zero-point detector 22a, which is explained in detail later on, monitors the signal at node A, which may be the cathode terminal of the diode 18b. Alternatively, as shown in FIG. 2, the node A may be the intermediate node between the resistors 18c and 18d that are serially connected between the cathode terminal of the diode 18b and GND.

In the power-supply unit 10 of this invention, a dotted terminal of the primary winding 12a of the transformer 12 is connected to the input power-supply 24 as shown in FIGS. 1 and 2. The other terminal of the primary winding 12a is connected to the drain of the switch 14. The source of the switch 14 is connected to GND through the resistor 26. The resistor 26 is used for converting the drain current to a voltage signal, which is used by the control unit 22.

The switch 14 switches the supply of input power to the primary winding 12a. That is, when the switch 14 is on, a positive current flows from the dotted terminal to the other terminal through the primary winding 12a.

The other terminal of the primary winding 12a of the transformer 12 is also connected to a terminal of the capacitor element 16. The other terminal of the capacitor element 16 is connected to the source of the switch 14.

The transformer 12 is equipped with the control winding 12c. The control winding 12c is connected to the rectifying and smoothing circuit 28. The DC output of the rectifying and smoothing circuit 28 is used as the power supply voltage (Vcc) of the control unit 22. In FIGS. 1 and 2, the rectifying and smoothing circuit 28 is equipped with the diode 28a and the capacitor element 28b. The anode terminal of the diode 28a is connected to the non-dotted terminal of the control winding 12c. The cathode terminal of the diode 28a is connected to a terminal of the capacitor element 28b. The other terminal of the capacitor element 28b is connected to GND. The voltage at the cathode terminal of the diode 28a is used as power supply (Vcc) of the control unit 22.

The other terminal of the control winding 12c is connected to the cathode terminal of the diode 18b. The anode terminal of the diode 18b is connected to a terminal of the resistor 18a. Both of the cathode terminal of the diode 18b and the terminal of the resistor 18a are connected to GND. The cathode terminal of the diode 18b is connected to the zero-point detector 22a. The zero-point detector 22a, which is a part of the control unit 22, monitors the signal at the cathode terminal of the diode 18b and detects the zero-point.

The information about the voltage change at the cathode terminal of the diode 18b, which is detected by the zero-point detector 22a, is forwarded to the controller 22b, which is also a part of the control unit 22. The controller 22b controls the on-timing of the switch 14 according to the change of the voltage detected by the zero-point detector 22a.

In FIGS. 1 and 2, a circuit including diodes and a capacitor element, which generates DC voltage from the AC input is used an exemplary input power-source unit 24. The input power-source unit 24 is not, however, limited to the circuit shown in FIGS. 1 and 2. Any types of power-source units can be used so long as a necessary power is supplied to the primary winding 12a of the transformer 12.

The non-dotted terminal of the secondary winding 12b of the transformer 12 is connected to the anode terminal of the diode 30a. The cathode terminal of the diode 30a is connected to a terminal of the capacitor 30b. The other terminal of the capacitor 30b is connected to the dotted terminal of the secondary winding 12b. These diode 30a and capacitor 30b constitute the rectifying and smoothing circuit 30. Both terminals of the capacitor 30b is connected to the load 32, and functions as an output terminals of the power-supply unit 10 of this exemplary embodiment.

Alternatively, the diode 30a may be connected between the dotted terminal of the secondary winding 12b and the capacitor 30b, with the cathode terminal thereof connected to the dotted terminal of the secondary winding 12b and the anode terminal thereof connected to the capacitor 30b. In either case, the diode 30a constitutes a rectifying circuit which allows a positive current to flow from the dotted terminal to the non-dotted terminal through the secondary winding 12b.

The feedback circuit 34 is the same as a conventional one, and detailed explanations are omitted.

In the above mentioned power-supply unit 10, the capacitor 16, which is connected between both terminals of the switch 14, is connected serially with the inductance Lp of the primary winding 12a of the transformer. Accordingly, the voltage between the both terminals of the switch 14 resonates after the discharge from the secondary winding 12b, same as the conventional power supply-unit shown in FIG. 4. The voltage resonance is detected by the voltage change at the control winding 12c. The voltage change at the control winding 12c is detected by the zero-point detector 22a by monitoring the voltage of the cathode terminal of the diode 18b.

The method of monitoring the voltage at the cathode terminal of the diode 18b is not specifically limited. The zero-point detector 22a may be directly connected to node A at the cathode terminal of the diode 18b as shown in FIG. 1. Alternatively, the voltage of the cathode terminal of the diode 18b may be divided by the resistors 18c and 18d, and the divided voltage may be input to the zero-point detector 22a, as the output from the node A, as shown in FIG. 2. In FIG. 2, the cathode terminal of the diode 18b is connected to GND via the resistors 18c and 18d. Because the resistors divide the voltage, the voltage value input to the zero-point detector 22a may be arbitrarily adjusted, and the versatility of the zero-point detector 22a may be improved.

Figure 3:
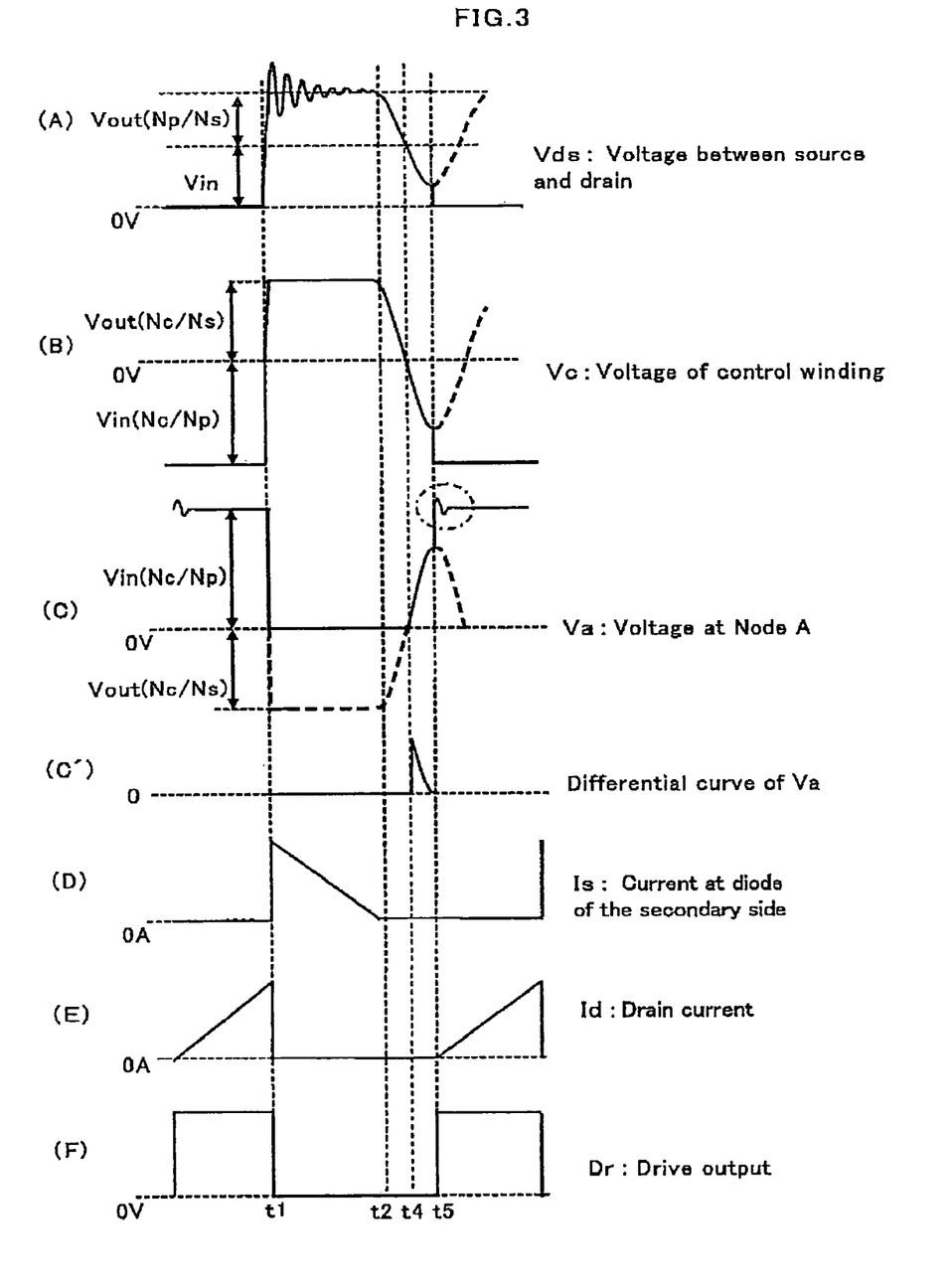
FIG. 3 shows exemplary wave profiles of drain voltage Vds, voltage Vc between both terminals of the control winding 12c, voltage at node A, differential value of voltage Va, secondary current Is, drain current Id and drive output Dr shown in the circuit layout of FIG. 2.

An exemplary switching method according to this invention is explained in detail with reference to FIG. 3. FIG. 3 shows exemplary waveforms of the drain voltage Vds of the switch 14 (waveform (A)), the voltage Vc of the non-dotted terminal of the control winding 12c relative to the dotted terminal thereof (waveform (B)), the voltage Va at the node A (waveform (C)), the differential value of the voltage Va (waveform (C')), the secondary current flows through the diode 30*a* Is (waveform (D)), the drain current of the switch 14 Id (waveform (E)), and the drive output from the controller 22*b* Dr (waveform (F)) in the exemplary power-supply unit shown in FIG. 1. The drain voltage Vds is a voltage between the both terminals, or the drain and the source, of the switch 14. Vin shown in FIG. 3 is a peak voltage of the AC input. Vout is the output voltage of the power-supply unit. Np, Ns and Nc are numbers of windings of the primary winding, the secondary winding, and the control winding of the transformer 12, respectively.

As indicated by the waveform (F), the switch 14 turns off at t1 and then turns on again at t5. The solid lines in FIG. 3 show actual waveforms when the switch 14 turns off and on at these timings. The broken lines after t5 show hypothetical waveforms assuming that the switch remains off after t5. The broken line between t1 and t5 shows a hypothetical waveform assuming that the diode 18*b* is not connected to the node A.

Because the voltage at Node A is positive after the zero-crossing of Vc, the detection of the zero-crossing point by the controller can be made to occur after t4.

Further, the zero-point detector 22*a* may detect timing when the voltage at the cathode terminal of the diode 18*b* takes its maximum value at t5. For this purpose, the zero-point detector 22*a* may include a differentiating circuit for generating a differential value of the input voltage at Node A. The unit for detecting zero-point 20*a* may detect the timing when the differential value of the input voltage is zero. The detected signal is transmitted to the controller 22*b*.

When the controller 22*b* receives the signal from the zero-point detector 22*a*, the controller 22*b* generates a control signal to turn on the switch 14 based on the signal from the zero-point detector 22*a*. As a result, the switch 14 turns on.

In the circuit shown in FIG. 1, discharge of energy from the secondary winding 12*b* of the transformer starts, and the current Is starts to flow through the diode 30*a*, when the switch 14 turns off at t1 as shown in FIG. 3. During the discharge, which continues during the period from t1 to t2 shown in FIG. 3, the voltage Vds between the both terminals, or the drain and the source, of the switch 14, is almost constant as can be seen by the waveform (A), although some noises are included.

When the discharge from the secondary winding 12*b* of the transformer is completed at t2, the electric charge stored in the snubber capacitor 16 starts to be discharged. Then, voltage resonance occurs between the inductance Lp of the primary winding 12*a* of the transformer and the capacitance Cr of the snubber capacitor 16. As a result, a slow oscillation of the drain voltage Vds starts to occur, as shown by the solid line from t2 to t5 and by the broken line from t5 onwards in the waveform (A).

After the switch 14 turns off at t1, the voltage Vc shown by the waveform (B) is output between the both terminals of the control winding 12*c*. The current generated by the voltage resonance in the primary side is converted into the voltage Vc. That is, the waveform shown by the solid line from t2 to t5 and the waveform shown by the broken line after t5 indicate the charge and discharge of the snubber capacitor 16. The snubber capacitor 16 starts to discharge when Vds goes down in the waveform (A), stops to discharge and re-starts to charge at the half cycle of the resonance. That is, when Vds becomes the minimum, or at the bottom of the resonance, the snubber capacitor 16 stops to discharge.

The voltage Vc between the both terminals of the control winding 12*c* is input to the monitoring circuit 18 including the resistor 18*a* and the diode 18*b*. The monitoring circuit 18 generates a monitoring signal having the voltage Va shown by the sold line of waveform (C) at the node A.

As indicated by the hypothetical waveform (C) shown by the broken line, a voltage opposite to the voltage Vc would appear at the node A if the diode 18*b* is not connected. The hypothetical waveform takes a peak at t5 that corresponds to the bottom of the resonance. However, the voltage at the node A is negative during the period between t1 and t2 and during the earlier half of the period between t2 and t5, if the diode 18*b* is not connected to the node A. It is difficult for the control unit 22, which operates with a positive power-supply voltage VCC, to monitor a signal that is negative.

In the exemplary monitoring circuit 18, the diode 18*b* is connected between the node A and the GND. The diode 18*b* shunts the negative voltage or, more exactly, limits the negative voltage to the forward voltage of the diode 18*b*. As a result, the voltage Va at the node A does not take a negative value greater than the forward voltage of the diode 18*b*.

Accordingly, as shown by the solid line of the waveform (C), a signal that can be easily monitored by the control unit 22 is generated at the node A. Because the signal does not take a negative value, normal operation of the control unit 22 is ensured.

Figure 6:
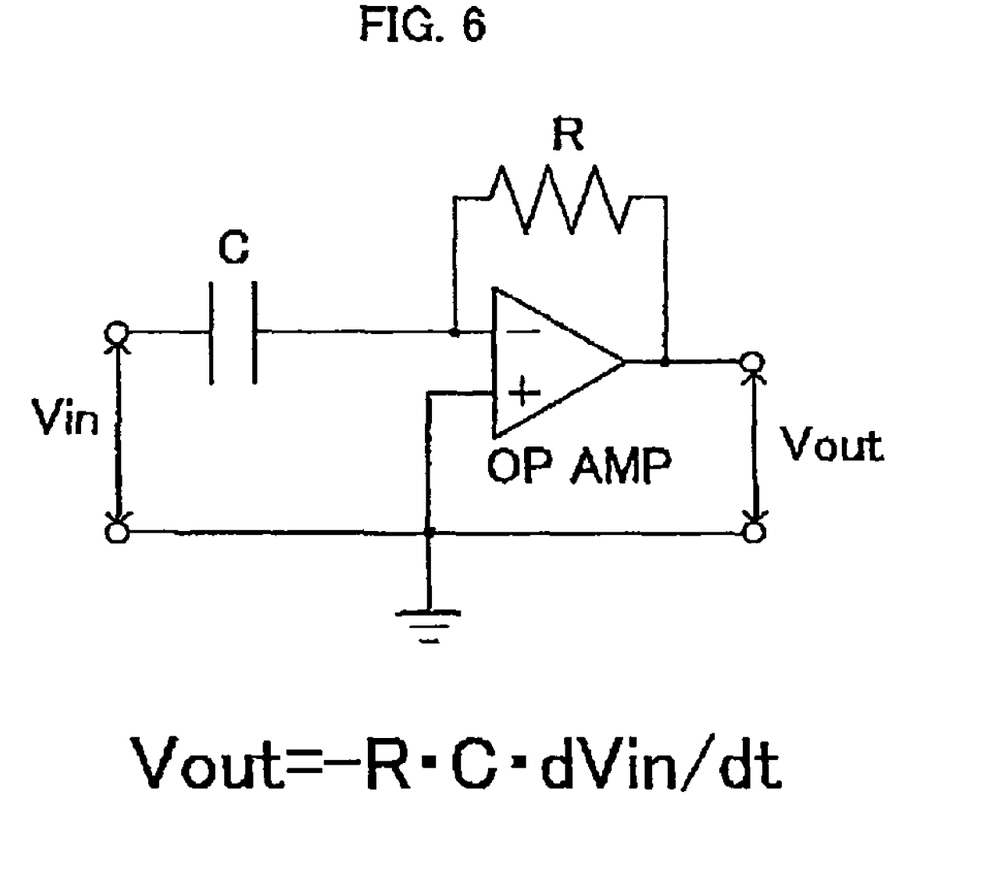
FIG. 6 shows an exemplary differentiating circuit of this invention.

The signal shown by the solid line of waveform (C) generated at the node A is input to the zero-point detector 22*a* of the control unit 22. The zero-point detector 22*a* may include a differentiating circuit and a circuit for detecting zero-point. An exemplary differentiating circuit is shown in FIG. 6. The differentiating circuit generates differential values of the input signal, which is shown by the waveform (C'). The circuit for detecting zero-point detects the zero-point of the differential signal.

That is, the zero-point detector 22*a* detects the timing when the differential signal shown by the waveform (C') becomes zero, which is the timing t5. As shown by FIG. 3, the t5 is the timing at the bottom of the resonance. Accordingly, the zero-point detector 22*a* detects the timing t5 at the bottom of the resonance.

Note that, in order to accurately detect the timing t5, the voltage drop across the resistor 18*a* should be negligible. This condition may be realized after t4 if the resistance of the resistor 18*a* is far smaller than the input impedance of the zero-point detector 22*a*, or is far smaller than the series resistance of the resistors 18*c* and 18*d* in the case of the circuit shown in FIG. 2.

The zero-point detector 22*a* supplies the detection signal to the controller 22*b* when it detects the timing t5. Based on the detection signal, the controller 22*b* generates control signal to turn on the switch 14. The switch 14 turns on by the control signal.

In this invention, as explained above, normal operation of the control unit is ensured and the timing t5 at the bottom of the voltage resonant is reliably detected. As a result, the switch 14 can surely be turned on when Vds is minimum. Thus, this invention provides a power-supply unit and a method of switching in a power-supply unit that minimizes the power loss occurred by the switching. Also, the switching method of this invention enables the switching with low noise.

In addition, the timing of turning on the switch 14 is controlled based on the voltage change at node A. Thus, it is not necessary to add a delay circuit used in conventional switching-type power supply units. Also, the switch 14 of the power-supply unit of this invention can be switched on at the lowest point of the drain voltage (Vds) even when the inductance Lp of the primary winding 12*a* of the transformer and/or the capacitance of the capacitor Cr of the snubber capacitor 16 are changed and the resonance frequency changes.

According to the switching method of the power-supply unit 10 of this exemplary embodiment, supply of the detection signal to the controller 22b may be masked during a predetermined period after turning on the switch 14.

FIG. 3 shows an exemplary case in which the waveform C at node A includes noise shown in the dashed-dotted circle when the switch 14 is turned on at t5 due to, for example, a coupling through capacitances between the metal layers in the circuit of the power-supply unit 10. An erroneous detection due to the noise may be preventing by the masking procedure.

In practice, for example, the monitoring signal input to the unit for zero-point detector 22a may be disregarded, the detecting operation in the zero-point detector 22a may be disabled, or the detection signal supplied from the zero-point detector 22a to the controller 22b may be disregarded during the predetermined period.

An exemplary period of the masking is preferably from 0.2 to 1.0 microsecond after the switch 14 is turned on. The period of masking is not limited to the above, and can be changed depending on the circuit parameters or the conditions of the usage of the power-supply unit 10.

This disclosure is not limited to a switching type power supply where the controller and switch are designed to work with positive voltages but also includes embodiments where the control and switch work with negative voltages, and the polarity of the active components is reversed. For example, the N-type MOSFET switch 14 replaced by a P-type MOSFET switch, and the directions of diodes 18b, 28a and 30a reversed.

What is claimed is:

1. A switching-type power-supply unit comprising:
   a transformer comprising a primary winding, a secondary winding and a control winding;
   a switch which switches supply of a primary current from a dotted terminal to a non-dotted terminal through the primary winding;
   a rectifying circuit which allows a secondary current to flow from a dotted terminal to a non-dotted terminal through the secondary winding;
   a monitoring signal generation circuit comprising a monitoring diode and a resistor, the monitoring diode disposed between GND and a dotted terminal of the control winding, the resistor disposed between GND and a non-dotted terminal of the control winding, the monitoring signal generation circuit generating a monitoring signal at a terminal of the diode connected to the dotted terminal of the control winding; and
   a control unit comprising a zero-point detector and a controller, the zero-point detector monitoring the monitoring signal and supplying a detection signal to the controller, the controller determining on-timing of the switch based on the detection signal supplied from the zero-point detector.

2. The switching-type power-supply unit according to claim 1, wherein: the switch includes a snubber capacitor, and the zero-point detector monitors the monitoring signal to detect a bottom of a resonance between an inductance of the primary winding and a capacitance of the snubber capacitor.

3. The switching-type power-supply unit according to claim 1, wherein:
   the zero-point detector comprises a differential circuit which generates a differential signal of the monitoring signal, and the zero-point detector supplies the detection signal when the differential signal of the monitoring signal reaches zero.

4. The switching-type power-supply unit according to claim 1, wherein:
   the control unit includes a masking unit that prohibits the detection signal from being supplied to the controller during a predetermined period after turning on the switch.

5. The switching-type power-supply unit according to claim 1 wherein the primary current is a positive current and an anode of the monitoring diode is connected to GND.

6. The switching-type power-supply unit according to claim 1 wherein the primary current is a negative current and a cathode of the monitoring diode is connected to GND.

7. A method of controlling a switching-type power-supply comprising:
   a transformer comprising a primary winding, a secondary winding and a control winding, a switch which switches supply of a primary current from a dotted terminal to a non-dotted terminal through the primary winding, and a rectifying circuit which allows a secondary current to flow from a dotted terminal to a non-dotted terminal through the secondary winding,
   the method comprising the steps of:
   providing a monitoring diode disposed between GND and a dotted terminal of the control winding, and a resistor disposed between GND and a non-dotted terminal of the control winding so that a monitoring signal is generated at the dotted terminal of the control winding;
   monitoring a differential signal of the monitoring signal to supply a detection signal when the differentiated signal reaches to zero after the switch turns off and discharge from the secondary winding through the rectifying diode is completed; and
   generating a control signal to turn on the switch when the detection signal is supplied.

8. The method according to claim 7, wherein:
   the switch includes a snubber capacitor, and the differential signal reaches to zero at a bottom of a resonance between an inductance of the primary winding and a capacitance of the snubber capacitor.

9. The method according to claim 7, further comprising:
   masking the detection signal during a predetermined period after the switch is turned on.

10. The method according to claim 7 wherein the primary current is a positive current and an anode of the monitoring diode is connected to GND.

11. The method according to claim 7 wherein the primary current is a negative current and a cathode of the monitoring diode is connected to GND.

* * * * *